(12) United States Patent
Fuoco et al.

(10) Patent No.: US 6,408,345 B1
(45) Date of Patent: Jun. 18, 2002

(54) SUPERSCALAR MEMORY TRANSFER CONTROLLER IN MULTILEVEL MEMORY ORGANIZATION

(75) Inventors: Charles L. Fuoco, Allen; Sanjive Agarwala, Richardson; David A. Comisky, Plano; Christopher L. Mobley, Coppell, all of TX (US)

(73) Assignee: Texas Instruments Incorporated, Dallas, TX (US)

( * ) Notice: Subject to any disclaimer, the term of this patent is extended or adjusted under 35 U.S.C. 154(b) by 206 days.

(21) Appl. No.: 09/603,331

(22) Filed: Jun. 26, 2000

Related U.S. Application Data (60) Provisional application No. 60/144,550, filed on Jul. 15, 1999, and provisional application No. 60/166,536, filed on Nov. 18, 1999.

(51) Int. Cl.[7] .................................. G06F 13/28
(52) U.S. Cl. .......................... 710/22; 710/100
(58) Field of Search ................ 711/100; 710/22, 710/27, 100

(56) References Cited

U.S. PATENT DOCUMENTS 5,107,416 A * 4/1992 Jippo et al. ............... 710/33
6,260,081 B1 * 7/2001 Magro et al. .............. 710/22
6,345,320 B1 * 2/2002 Kawamata et al. ......... 710/22
6,351,781 B1 * 2/2002 Gracias et al. ............. 710/22

* cited by examiner

Primary Examiner—David L. Robertson
(74) Attorney, Agent, or Firm—Robert D. Marshall, Jr.; W. James Brady, III; Frederick J. Telecky, Jr.

(57) ABSTRACT

This invention is a data processing system including a central processing unit executing program instructions to manipulate data, at least one level one cache, a level two unified cache, a directly addressable memory and a direct memory access unit adapted for connection to an external memory. A superscalar memory transfer controller schedules plural non-interfering memory movements to and from the level two unified cache and the directly addressable memory each memory cycle in accordance with a predetermined priority of operation. The level one cache preferably includes a level one instruction cache and a level one data cache. The superscalar memory transfer controller is capable of scheduling plural cache tag memory read accesses and one cache tag memory write access in a single memory cycle. The superscalar memory transfer controller is capable of scheduling plural of cache access state machines in a single memory cycle. The superscalar memory transfer controller is capable of scheduling plural memory accesses to non-interfering memory banks of the level two unified cache in a single memory cycle.

10 Claims, 5 Drawing Sheets

(1) L1I CACHE MISS FILL FROM L2
(2) L1D CACHE MISS FILL FROM L2
(3) L1D WRITE MISS TO L2, OR L1D VICTIM TO L2, OR L1D SNOOP RESPONSE TO L2
(4) L2 CACHE MISS FILL, OR DMA INTO L2
(5) L2 VICTIM WRITE BACK, OR DMA OUT OF L2
(6) DMA INTO L2
(7) DMA OUT OF L2

SUPERSCALAR MEMORY TRANSFER CONTROLLER IN MULTILEVEL MEMORY ORGANIZATION

This application claims priority under 35 USC §119(e)(1) of Provisional Application No. 60/144,550, filed Jul. 15, 1999 now abandoned and Provisional Application No. 60/166,536, filed Nov. 18, 1999 now abandoned.

TECHNICAL FIELD OF THE INVENTION

The technical field of this invention is data processing systems and particularly data processing systems with cache memory, static random access memory and direct memory access.

BACKGROUND OF THE INVENTION

Data processing systems typically employ data caches or instruction caches to improve performance. A small amount of high speed memory is used as the cache. This cache memory is filled from main memory on an as needed basis. When the data processor requires data or an instruction, this is first sought from the cache memory. If the data or instruction sought is already stored in the cache memory, it is recalled faster than it could have been recalled from main memory. If the data or instruction sought is not stored in the cache memory, it is recalled from main memory for use and also stored in the corresponding cache. A performance improvement is achieved using cache memory based upon the principle of locality of reference. It is likely that the data or the instruction just sought by the data processor will be needed again in the near future. Use of cache memories speeds the accesses needed to service these future needs. A typical high performance data processor will include instruction cache, data cache or both on the same integrated circuit as the data processor core.

Cache memories are widely used in general purpose microprocessors employed in desktop personal computers and workstations. Cache memories are frequently used in microprocessors employed in embedded applications in which the programmable nature of the microprocessor controller is invisible to the user. Caching provides a hardware managed, programmer transparent access to a large memory space via a physically small static random access memory (SRAM) with an average memory access time approaching the access time of the SRAM. The hardware managed and programmer transparent aspect of cache systems enables better performance while freeing the programmer from explicit memory management.

Cache memories are typically not used with digital signal processors. Digital signal processors are generally used in applications with real time constraints. Such real time constraints typically do not operate well with cache memories. When employing cache memories the access time for a particular instruction or data cannot be predetermined. If the sought item is stored in the cache, then the access time is a known short time. However, if the item sought is not stored in the cache, then the access time will be very much longer. Additionally, other demands for main memory access will make the access time from main memory vary greatly. This variation in memory access time makes planning for real time applications extremely difficult or impossible.

Digital signal processors will more typically include some directly addressable SRAM on the same integrated circuit as the data processor core. The programmer must manage transfer of critically needed instructions and data to the on-chip SRAM. Often this memory management employs a direct memory access unit. A direct memory access unit typically controls data moves between memories or between a memory and a peripheral ordered by the data processor core. Once begun on a particular data transfer the direct memory access unit operates autonomously from the data processor core. Once stored in the on-chip SRAM, these items are available to the data processor core at a greatly lowered access time. Thus these items will be available to service the real time constraints of the application. Note that both the data processor core and the direct memory access unit may access the on-chip SRAM. The memory management task is difficult to program. The programmer must anticipate the needs of the application for instructions and data and assure that these items are loaded into the on-chip SRAM ahead of their need. Additionally, the programmer must juggle conflicting needs for the typically limited space of the on-chip SRAM. While this is a difficult programming task, it is generally preferable to the unknown memory latencies of cache systems in real time applications.

Digital signal processor architectures are becoming more complex. The complexity of new applications have increased and their real time constraints have become more stringent. These advances have made the programming problem of real time memory management using on-chip SRAM increasingly difficult. This has slowed applications development. With variety in the size of on-chip SRAM and the variations in external memory latency, these programs have increasingly been limited to specific product configurations. Thus it has not been possible to employ the same set of instructions to solve a similar memory management problem in a similar product. This need for custom algorithms for each product prevents re-use of instruction blocks and further slows product development. The increasing architectural capabilities of processors also require bigger on-chip memories (either cache or SRAM) to prevent processor stalls. Processor frequencies are increasing. This increasing memory size and processor frequency works against easy scaling of the on-chip memory with increasing data processing requirements.

These increasing demands upon digital signal processors creates a need in the art for a cache system that better utilizes the data movement hardware to achieve better cache performance.

SUMMARY OF THE INVENTION

This invention is a data processing system including a central processing unit executing program instructions to manipulate data, at least one level one cache temporarily storing at least one of program instructions and data, a level two unified cache for supply of instructions and data to the level one data cache, a directly addressable memory and a direct memory access unit adapted for connection to an external memory. A superscalar memory transfer controller schedules plural non-interfering memory movements to and from the level two unified cache and the directly addressable memory each memory cycle in accordance with a predetermined priority of operation. The at least one level one cache preferably includes a level one instruction cache and a level one data cache.

The level two unified cache includes a cache tag memory with plural read ports and a single write port. The superscalar memory transfer controller is capable of scheduling plural cache tag memory read accesses and one cache tag memory write access in a single memory cycle.

The level two unified cache includes a cache access state machine for each level one cache, a cache access state machine for the direct memory access unit, a cache access state machine for level two unified cache read miss service, a cache access state machine for level two unified cache write miss service and a cache access state machine for victim eviction service. The superscalar memory transfer controller is capable of scheduling plural of cache access state machines in a single memory cycle.

The level two unified cache consists of plural memory banks. The superscalar memory transfer controller is capable of scheduling plural memory accesses to non-interfering memory banks of the level two unified cache in a single memory cycle.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
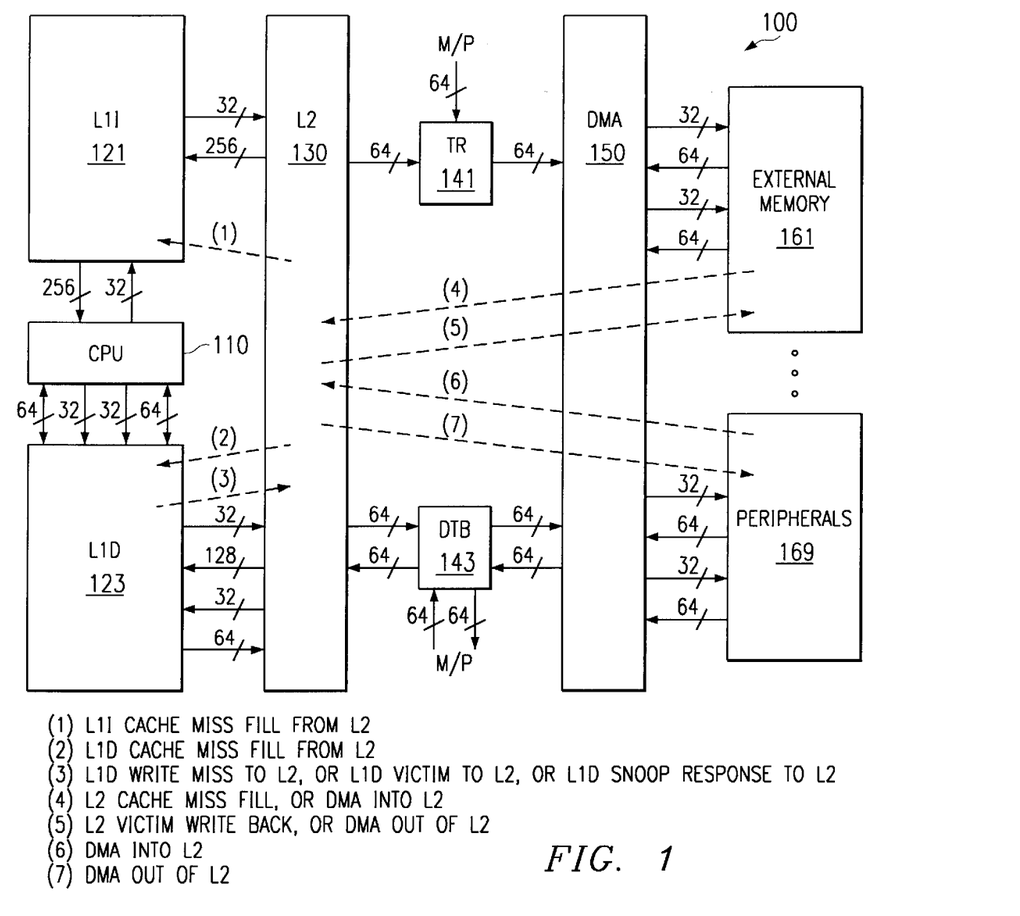
FIG. 1 illustrates the organization of a typical digital signal processor to which this invention is applicable.

FIG. 1 illustrates the organization of a typical digital signal processor system 100 to which this invention is applicable. Digital signal processor system 100 includes central processing unit core 110. Central processing unit core 110 includes the data processing portion of digital signal processor system 100. Central processing unit core 110 could be constructed as known in the art and would typically includes a register file, an integer arithmetic logic unit, an integer multiplier and program flow control units. An example of an appropriate central processing unit core is described below in conjunction with FIGS. 4 and 5.

Digital signal processor system 100 includes a number of cache memories. FIG. 1 illustrates a pair of first level caches. Level one instruction cache (L1I) 121 stores instructions used by central processing unit core 110. Central processing unit core 110 first attempts to access any instruction from level one instruction cache 121. Level one data cache (L1D) 123 stores data used by central processing unit core 110. Central processing unit core 110 first attempts to access any required data from level one data cache 123. The two level one caches are backed by a level two unified cache (L2) 130. In the event of a cache miss to level one instruction cache 121 or to level one data cache 123, the requested instruction or data is sought from level two unified cache 130. If the requested instruction or data is stored in level two unified cache 130, then it is supplied to the requesting level one cache for supply to central processing unit core 110. As is known in the art, the requested instruction or data may be simultaneously supplied to both the requesting cache and central processing unit core 110 to speed use.

Level two unified cache 130 is further coupled to higher level memory systems. Digital signal processor system 100 may be a part of a multiprocessor system. The other processors of the multiprocessor system are coupled to level two unified cache 130 via a transfer request bus 141 and a data transfer bus 143. A direct memory access unit 150 provides the connection of digital signal processor system 100 to external memory 161 and external peripherals 169.

In accordance with the preferred embodiment of this invention, level two unified cache 130 may be configured to include variable amounts of static random access memory (SRAM) instead of cache memory. This aspect of the digital signal processor system is further detailed in contemporaneously filed U.S. patent application Ser. No. 09/603,645 (TI-29343) entitled UNIFIED MEMORY SYSTEM ARCHITECTURE INCLUDING CACHE AND DIRECTLY ADDRESSABLE STATIC RANDOM ACCESS MEMORY. In accordance with the invention described in this contemporaneously filed patent application some or all of level two unified cache 130 may be configured as normal read/write memory which operates under program control. If some of level two unified cache 130 is configured as SRAM, then this memory space may be either a source or a destination of a direct memory access. This will be more fully described below.

The complex interrelation of parts of digital signal processor system 100 permits numerous data movements. These are illustrated schematically in FIG. 1 and will be listed here. First, level one instruction cache 121 may receive instructions recalled from level two unified cache 130 (1) for a cache miss fill. In this example, there is no hardware support for self-modifying code so that instructions stored in level one instruction cache 121 are not altered. There are two possible data movements between level one data cache 123 and level two unified cache 130. The first of these data movements is a cache miss fill from level two unified cache 130 to level one data cache 123 (2). Data may also pass from level one data cache 123 to level two unified cache 130 (3). This data movement takes place upon; a write miss to level one data cache 123 which must be serviced by level two unified cache 130; a victim eviction from level one data cache 123 to level two unified cache 130; and a snoop response from level one data cache 123 to level two unified cache 130. Data can be moved between level two unified cache 130 and external memory 161. This can take place upon: a cache miss to level two unified cache 130 service from external memory (4) or a direct memory access 150 data movement from external memory 161 and level two unified cache 130 configured as SRAM; a victim eviction from level two unified cache 130 to external memory 161 (5) or a direct memory access 150 data movement from a portion of level two unified cache 130 configured as SRAM to external memory 161. Finally, data can move between level two unified cache 130 and peripherals 169. These movements take place upon: a direct memory access 150 data movement from peripheral 169 to level two unified cache 130 configured as SRAM; or a direct memory access 150 data movement from a portion of level two unified cache 130 configured as SRAM to peripherals 169. All data movement between level two unified cache 130 and external memory 161 and between level two unified cache 130 and peripherals 169 employ data transfer bus 143 and are controlled by direct memory access unit 150. These direct memory access data movements may take place as result of a command from central processing unit core 110 or a command from another digital signal processor system received via transfer request bus 141.

The number and variety of possible data movements within digital signal processor system 100 makes the problem of maintaining coherence difficult. In any cache system data coherence is a problem. The cache system must control data accesses so that each returns the most recent data. As an example, in a single level cache a read following a write to the same memory address maintained within the cache must return the newly written data. This coherence must be maintained regardless of the processes within the cache. This coherence preserves the transparency of the cache system. That is, the programmer need not be concerned about the data movements within the cache and can program without regard to the presence or absence of the cache system. This transparency feature is important if the data processor is to properly execute programs written for members of a data processor family having no cache or varying amounts of cache. The cache hardware must maintain the programmer illusion of a single memory space. An example of an ordering hazard is a read from a cache line just victimized and being evicted from the cache. Another example in a non-write allocate cache is a read from a cache line following a write miss to that address with the newly written data in a write buffer waiting write to main memory. The cache system must include hardware to detect and handle such special cases.

A cache system including a second level cache, such as that described above in conjunction with FIG. 1, introduces additional hazards. Coherence must be maintained between the levels of cache no matter where the most recently written data is located. Generally level one caches accessing data will have the most recent data while the level two cache may have old data. If an access is made to the level two cache the cache system must determine if a more recent copy of the data is stored in a level one cache. This generally triggers a snoop cycle in which the level two cache polls the level one cache for more recent data before responding to the access. A snoop is nearly like a normal access to the snooped cache except that snoops are generally given higher priority. Snoops are granted higher priority because another level cache is stalled waiting on the response to the snoop. If the data stored in the lower level cache has been modified since the last write to the higher level cache, then this data is supplied to the higher level cache. This is referred to as a snoop hit. If the data stored in the lower level cache is clean and thus not been changed since the last write to the higher level cache, then this is noted in the snoop response but no data moves. In this case the higher level cache stores a valid copy of the data and can supply this data.

Additional hazards with a two level cache include snoops to a lower level cache where the corresponding data is a victim being evicted, snoops to data in during a write miss in the lower level cache for non-write allocation systems which places the data in a write buffer. Level two unified cache 130 may need to evict a cache entry which is also cached within level one instruction cache 121 or level one data cache 123. A snoop cycle is required to ensure the latest data is written out to the external main memory. A write snoop cycle is transmitted to both level one instruction cache 121 and level one data cache 123. This write snoop cycle misses if this data is not cached within the level one caches. Level one data cache 123 reports the snoop miss to level two unified cache 130. No cache states within level one data cache 123 are changed. Upon receipt of the snoop miss report, level two unified cache 130 knows that it holds the only copy of the data and operates accordingly. If the snoop cycle hits a cache entry within level one data cache 123, the response differs depending on the cache state of the corresponding cache entry. If the cache entry is not in a modified state, then level two unified cache 130 has a current copy of the data and can operate accordingly. The cache entry is invalidated within level one data cache 123. It is impractical to maintain cache coherency if level one data cache 123 caches the data and level two unified cache 130 does not. Thus the copy of the data evicted from level two unified cache 130 is no longer cached within level one data cache 123. If the cache entry in level one data cache 123 is in the modified state 303 and thus had been modified within that cache, then the snoop response includes a copy of the data. Level two unified cache 130 must merge the data modified in level one data cache 123 with data cached within it before eviction to external memory. The cache entry within level one data cache 123 is invalidated.

In a similar fashion snoop cycles are sent to level one instruction cache 121. Since the digital signal processing system 100 cannot modify instructions within level one instruction cache 121, no snoop return is needed. Upon a snoop miss nothing changes within level one instruction cache 121. If there is a snoop hit within level one instruction cache 121, then the corresponding cache entry is invalidated. A later attempt to fetch the instructions at that address will generate a cache miss within level one instruction cache 121. This cache miss will be serviced from level two unified cache 130.

Figure 2:
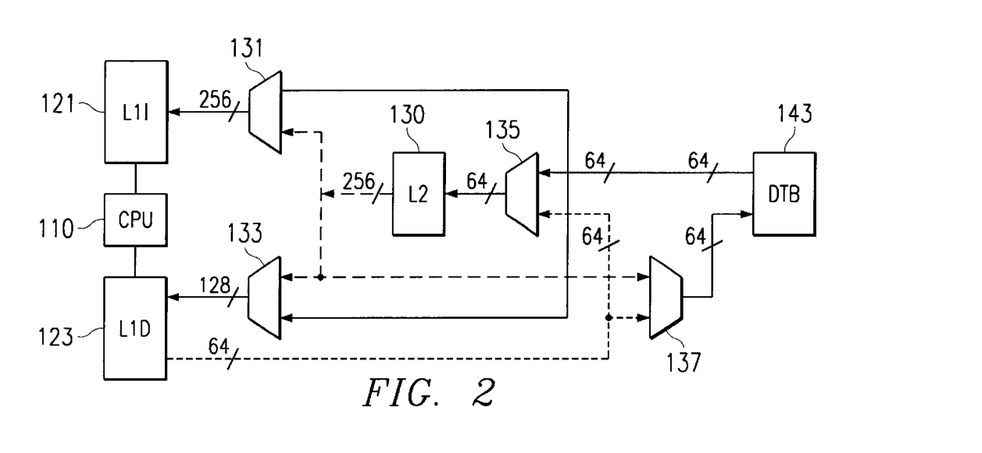
FIG. 2 illustrates the data paths to and from the level two unified cache illustrated in FIG. 1.

FIG. 2 illustrates the data connections among parts of digital signal processing system 100 illustrated in FIG. 1. FIG. 2 illustrates the data path widths between the various parts. The level one instruction cache interface includes a 256-bit data path from level two unified cache 130 to level one instruction cache 121. This data path size corresponds to one half of the 64 byte cache line size within level one instruction cache 121 and equals one instruction fetch packet. In the preferred embodiment, the 256-bits are 64 bits from each of the four banks of level two unified cache 130. Thus level two unified cache 130 can source this amount of data in a single cycle. This occurs regardless of the amount of level two unified cache 130 configured as cache. The cache/SRAM partitioning within level two unified cache 130 is across the data banks rather than within the data banks. Thus level two unified cache 130 can always supply 256 bits to level one instruction cache 121 if any part is partitioned as cache. Level one instruction cache 121 may also receive data directly from data transfer bus 143, for example upon fetching code from non-cacheable memory addresses. Data transfer bus 143 supplies only 64 bits per cycle, thus at least four cycles are needed to accumulate the 256 bits. The data source for transfers to level one instruction cache 121 is selected by multiplexer 131. FIG. 1 illustrates supply of 32 address bits from level one instruction cache 121 to level two unified cache 130. Because level one instruction cache 121 operates on 256 bit boundaries, the 8 least significant bits are always zero and may be omitted from the address. Note that writes to level one instruction cache 121 are not permitted, therefore level one instruction cache 121 never supplies data to level two unified cache 130.

The level one data cache interface includes a 128-bit data path from level two unified cache 130 to level one data cache 123. In the preferred embodiment, the 128 bits are 64 bits from each of two banks of level two unified cache 130. This assumes no bank conflicts with other data transfers. Level two unified cache 130 only services one cache fill data transfer to level one data cache 123 per cycle. Thus if two load/store units in central processing unit 110 each request data and produce a read cache miss within level one data cache 123, the two read miss requests to level two unified cache 130 are serviced in sequence. As noted above, the cache/SRAM partitioning of level two unified cache 130 is across the memory banks. Thus level two unified cache 130 can supply data to level one data cache 123 from two banks so long as level two unified cache 130 is partitioned to include some cache. Level one data cache 123 may also receive data directly from data transfer bus 143, for example upon fetching data from non-cacheable memory addresses. Data transfer bus 143 supplies only 64 bits per cycle, however accesses to non-cacheable memory addresses are at most 32 bits. In this case, the 32 bits are transferred in a single data transfer cycle. The data source for transfers to level one data cache 123 is selected by multiplexer 133. FIG. 1 illustrates supply of two sets of 32 address bits from level one data cache 123 to level two unified cache 130. Because level one data cache 123 operates on 64 bit boundaries, the 6 least significant bits are always zero and may be omitted from the address.

Level one data cache 123 may supply data to level two unified cache 130. This occurs on a write miss, a cache entry eviction and a response to a snoop hit to data in the modified state within level one data cache 123. It is possible that each of the load/store units within central processing unit 110 would require data transfer from level one data cache 123 to level two unified cache 130 in the same cycle. Upon a write miss within level one data cache 123, only the 32 bits of the write data is supplied from level one data cache 123 to level 2 unified cache 130. For either a cache eviction or a snoop data response, level one data cache 121 supplies 128 bits to level two unified cache 130, the same data width as opposite transfers. Data from level one data cache 123 may also be supplied to data transfer bus 143 as selected by multiplexer 137. This could occur as a result of a write to a non-cacheable address.

The interface between level two unified cache 130 and data transfer bus 143 includes two 64-bit data busses. A first of these data busses supplies data from data transfer bus 143 to level two unified cache 130. This data may be stored in level two unified cache 130 via a single 64-bit write port as selected by multiplexer 135. The second bus is a 64-bit bus supplying data from level two unified cache 130 or level one data cache 123 as selected by multiplexer 137. All transfers using data transfer bus 143 employ direct memory access unit 150 responsive to commands via transfer request bus 141.

The following description of the invention is directed to a generically described cache architecture which may have multiple levels. The features of the described invention may not be valid for all levels of the cache. However, it will generally be plain where features do and do not apply. Since most cache systems are limited to 2 levels at the most, the examples included in this application are limited to the two level cache architecture described in conjunction with FIGS. 1 and 2.

Level two unified memory 130 must service many data transfer requesters. These include level one instruction cache 121, level one data cache 123 and direct memory access unit 150. The simplest method to accommodate these plural data transfer requesters is to serialize any simultaneous requests and service them one at a time. This invention proposes to service multiple requesters simultaneously so long as the requested data transfers do not stall. This technique enables faster completion of memory accesses to level two unified cache 130 and hence faster operation of digital signal processing system 100.

This invention is similar to microprocessor superscalar operation. In superscalar operation a microprocessor with multiple functional units may simultaneously service plural instructions. The microprocessor decodes received instructions to determine the data processing function required. When consecutive instructions do not conflict, either by data conflicts or functional unit conflicts, then more than one instruction may be scheduled in parallel. A similar superscalar technique is proposed in this invention. If multiple requests are received in the same cycle, then level two unified cache 130 checks to determine if there are resource conflicts. If there are no conflicts then the multiple requests are scheduled to execute simultaneously. If there are conflicts, then the tasks must be scheduled sequentially.

In the example digital signal processing system 100 illustrated in FIG. 1, there are three requesters. These are: level one instruction cache 121; level one data cache 123; and direct memory access unit 150. In the present invention these requesters operate independently and can issue a data transfer request in the same cycle. The cache scheduler must check for conflicts and appropriately schedule the requests including scheduling nonconflicting requests simultaneously.

Figure 3:
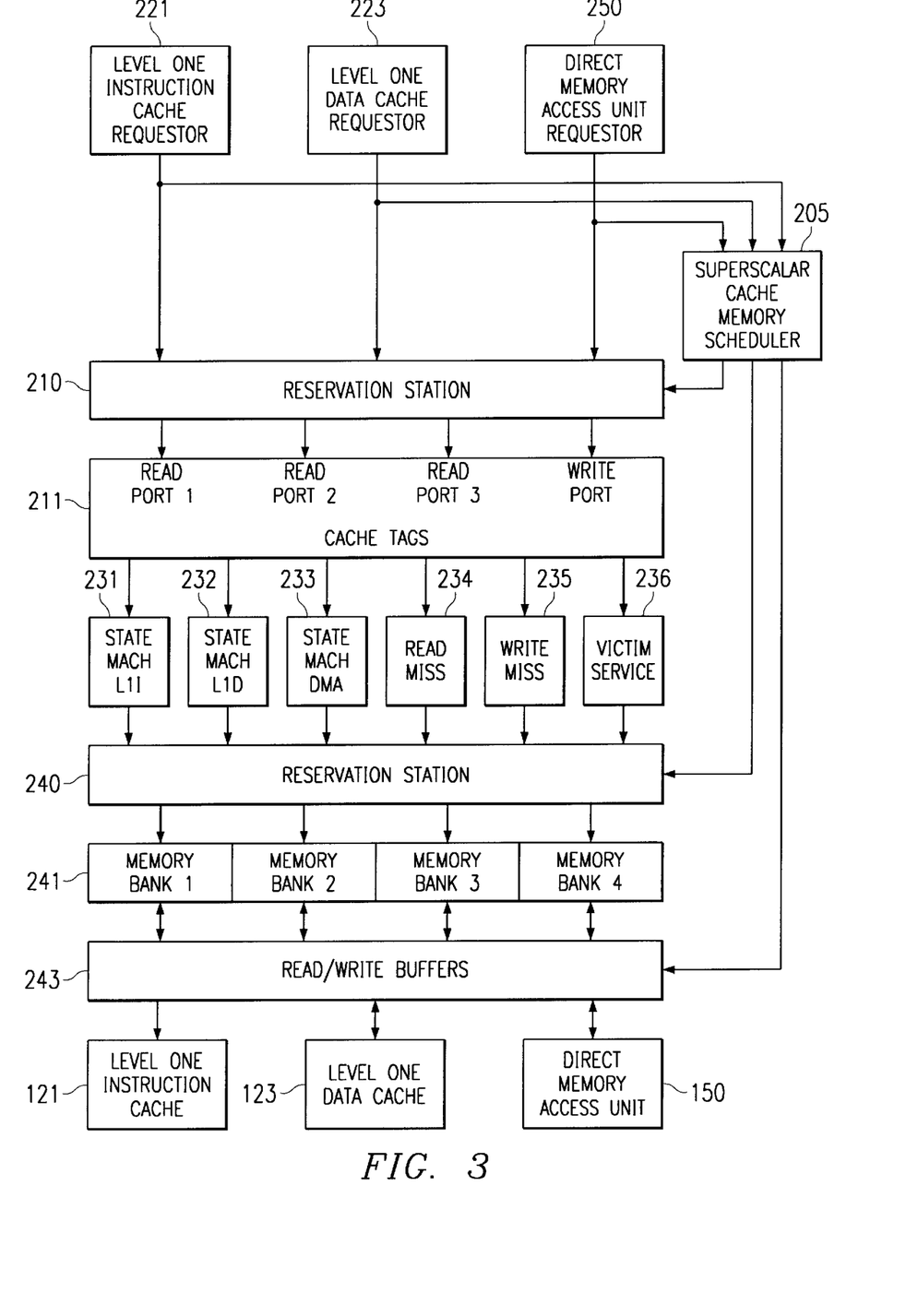
FIG. 3 is a resource/schedule diagram illustrating the operation of level two unified cache 130.

FIG. 3 is a resource/schedule diagram illustrating the operation of level two unified cache 130. The three requesters are level one instruction cache requester 221, level two data cache requester 223 and direct memory access unit requester 250. Level one instruction cache requester 221 may request cache fill data from level two unified cache 130. As previously described and illustrated in FIG. 2, this cache fill is preferably one instruction fetch packet and consists of 256 bits. In the preferred embodiment central processing unit 110 includes two load/store units, each of which may request data transfer each cycle. The requests from level one data cache requester 223 may be for cache fills on read misses or for writes upon write misses. In the preferred embodiment level one data cache 123 only transmits one data transfer request to level two unified cache 130 per cycle. Thus if two load/store units in central processing unit 110 each request data and produce a read cache miss within level one data cache 123, the two read miss requests to level two unified cache 130 are serviced in sequence. Direct memory access unit requester 250 may request a direct memory access write the portion of level two unified cache 130 configured as directly addressable SRAM or may request a direct memory read from this SRAM portion of level two unified cache 130. Each of these requesters sends information to superscalar cache memory scheduler 205. Superscalar cache memory scheduler 205 controls scheduling and sequencing data transfer requests in a manner described below.

The first potential bottleneck in accessing level two unified cache 130 is access to the cache tags. In the preferred embodiment cache tags 211 includes three read ports (Read ports 1, 2 and 3) and one write port. Thus cache tags 211 can service the cache tag access requests of all three requesters 221, 223 and 250 if only one tag write is required. Superscalar cache memory controller 205 serializes any cache tag writes at reservation station 210.

Following the cache tag access the three requesters each feed a cache access state machine. Level one instruction cache requester 221 triggers state machine L1I 231. Level one data cache requester 223 triggers state machine L1D 232. Direct memory access unit requester 250 triggers state machine DMA 233. Providing a cache access state machine for each requester ensures that all possible three cache accesses can be serviced in the same cycle.

The cache tags access also triggers a second set of cache access state machines. These additional state machines handle special cache hazards. Read miss state machine 334 is triggered upon a read miss and handles requesting read miss data from the main memory and storing it in level two unified cache 130. Write miss state machine 235 is triggered upon a write miss. In the preferred embodiment level two unified cache 130 implements a write allocation policy. Upon a write miss the data at the miss address is recalled from the main memory and stored in level two unified cache 130. The write then completes within the cache. Write allocation may save a read miss or write miss to the same cache entry. Write miss state machine 235 controls the process of handling the write miss. Victim eviction service state machine 236 is triggered for any cache entry replacement. If the cache entry is clean, that is if it has not been changed within the level two unified cache 130, then the victim cache entry is merely replaced. If the cache entry is dirty, that is if it had been changed within the level two unified cache 130, then the victim cache entry must be written back to main memory when replaced. These second set of cache access state machines may complete with the primary cache access state machines 231, 232 and 233 for later resources.

The cache access state machines control access to the memory banks 241 of level two unified cache 130. In the preferred embodiment level two unified cache includes four memory banks. The different requesters require differing data widths. As previously described in conjunction with FIG. 2, level one instruction cache 121 receives one fetch packet of 256 bits each cycle. This requires 64 bits to be supplied from each memory bank. Thus service of a level one instruction cache fill requires all the memory bank resources. No other cache access can occur with a level one instruction cache fill. Note that level one instruction cache 121 has cache entries of two fetch packets or 512 bits. Thus two entire level two unified cache cycles are required to service a read miss within level one instruction cache 121. Each level one data cache access requires 64 bits using one bank of level two unified cache 130. Direct memory access unit read or write accesses are each 64 bits. Thus absent a memory bank conflict a direct memory access read can execute in parallel with a level one data cache access. A direct memory access write can execute in parallel with a level one data cache read access absent a memory bank conflict. Superscalar cache memory controller serializes accesses to memory banks 241 in reservation stations 240.

Finally, level two unified cache 130 includes a set of read and write buffers between the various parts. Superscalar cache memory controller 205 controls allocation of these buffers. Read and write buffers 243 couple memory banks 241 to level one instruction cache 121, level one data cache 123 and direct memory access unit 150.

There are eight potential data transfers associated with level two unified cache 130. Thus a priority scheme among these transfers is needed. Table 1 lists the preferred priority hierarchy within level two unified cache 130.

TABLE 1

| Priority Level | From | To | Task |
|---|---|---|---|
| 1 | L2 | L1I | L1I cache miss and L2 cache hit |
| 2 | L2 | L1D | L1D cache miss and L2 cache hit |
| 3 | L1D | L2 | L1D victim eviction (writeback) to L2 |
| 4 | L2/SRAM | External Memory | Direct memory access read from L2/SRAM |
| 5 | External Memory | L2/SRAM | Direct memory access write to L2/SRAM |

TABLE 1-continued

| Priority Level | From | To | Task |
|---|---|---|---|
| 6 | L1D | L2 | L1D snoop data merge into L2 |
| 7 | External Memory | L2 | L2 cache miss fill |
| 8 | L2 | External memory | L2 victim eviction (writeback) external memory |

Note:
"L2" refers to a cache configured portion of level two unified cache 130; and L2/SRAM refers to a directly addressable memory configured portion of level two unified cache 130. In the case of a resource conflict in cache access within level two unified cache 130, superscalar cache memory controller 205 uses the hierarchy of Table 1 to determine the order of service.

Figure 4:
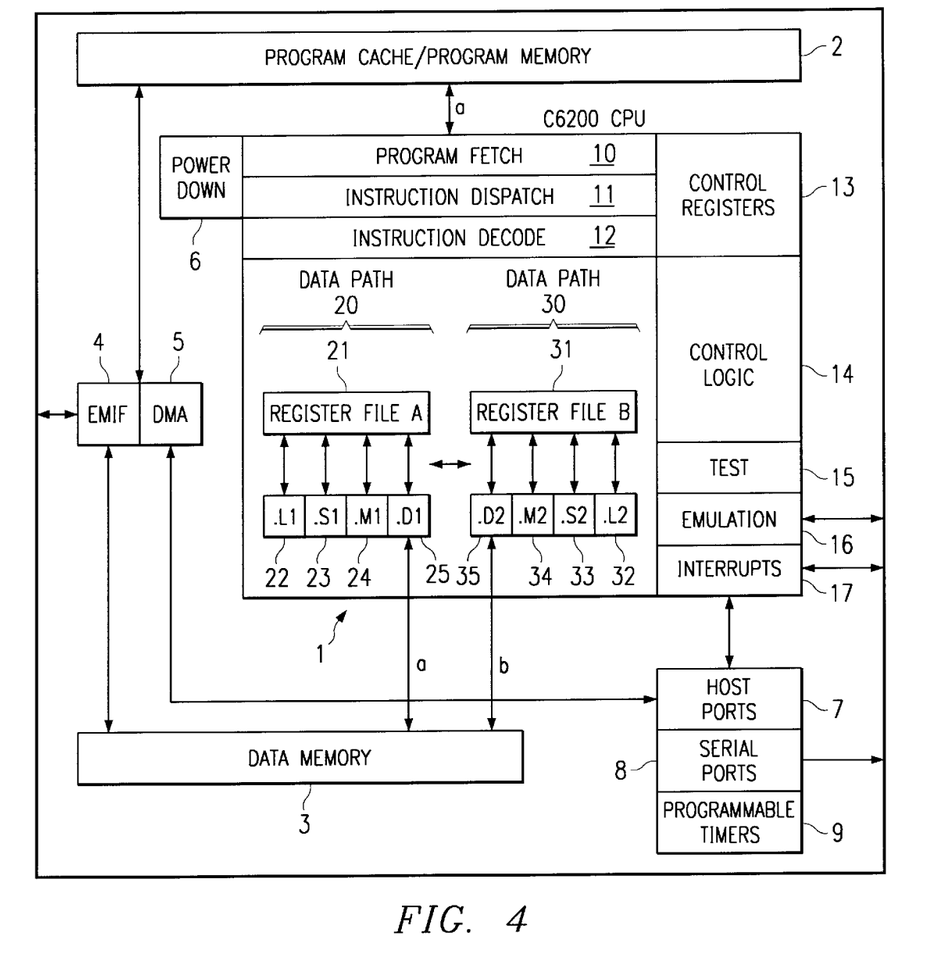
FIG. 4 illustrates details of a very long instruction word digital signal processor core suitable for use in FIG. 1.

FIG. 4 is a block diagram illustrating details of a signal processor core suitable for this invention. The signal processor core of FIG. 4 is a 32-bit eight-way VLIW pipelined processor. The digital signal processor includes central processing unit 1, shown in the right center portion of FIG. 4. The digital signal processor includes program memory 2 which may optionally be used as a program The digital signal processor may also have varying sizes and types of data memory 3. The digital signal processor also includes peripherals 4 to 9. These peripherals preferably include an external memory interface (EMIF) 4 and a direct memory access (DMA) controller 5. External memory interface (EMIF) 4 preferably supports access to supports synchronous and asynchronous SRAM and synchronous DRAM. Direct memory access (DMA) controller 5 preferably provides 2-channel auto-boot loading direct memory access. These peripherals include power-down logic 6. Power-down logic 6 preferably can halt central processing unit activity, peripheral activity, and phase lock loop (PLL) clock synchronization activity to reduce power consumption. These peripherals also include host ports 7, serial ports 8 and programmable timers 9.

The digital signal processor core has a 32-bit, byte addressable address space. Internal memory on the same integrated circuit is preferably organized in a data space including data memory 3 and a program space including program memory 2. When off-chip memory is used, preferably these two spaces are unified into a single memory space via the external memory interface (EMIF) 4.

Data memory 3 may be internally accessed by central processing unit 1 via two internal ports 3a and 3b. Each internal port 3a and 3b preferably has 32 bits of data and a 32-bit byte address reach. Program memory 2 may be internally accessed by central processing unit 1 via a single port 2a. Port 2a of program memory 2 preferably has an instruction-fetch width of 256 bits and a 30-bit word (four bytes) address, equivalent to a 32-bit byte address.

Central processing unit 1 includes program fetch unit 10, instruction dispatch unit 11, instruction decode unit 12 and two data paths 20 and 30. First data path 20 includes four functional units designated L1 unit 22, S1 unit 23, M1 unit 24 and D1 unit 25 and 16 32-bit registers forming register file 21. Second data path 30 likewise includes four functional units designated L2 unit 32, S2 unit 33, M2 unit 34 and D2 unit 35 and 16 32-bit registers forming register file 31. Central processing unit 1 includes control registers 13, control logic 14, and test logic 15, emulation logic 16 and interrupt logic 17.

Program fetch unit 10, instruction dispatch unit 11 and instruction decode 12 unit recall instructions from program memory 2 and deliver up to eight 32-bit instructions to the functional units every instruction cycle. Processing occurs in each of the two data paths 20 and 30. As previously described above each data path has four corresponding functional units (L, S, M and D) and a corresponding register file containing 16 32-bit registers. Each functional unit is controlled by a 32-bit instruction. The data paths are further described below. A control register file 13 provides the means to configure and control various processor operations.

Figure 5A:
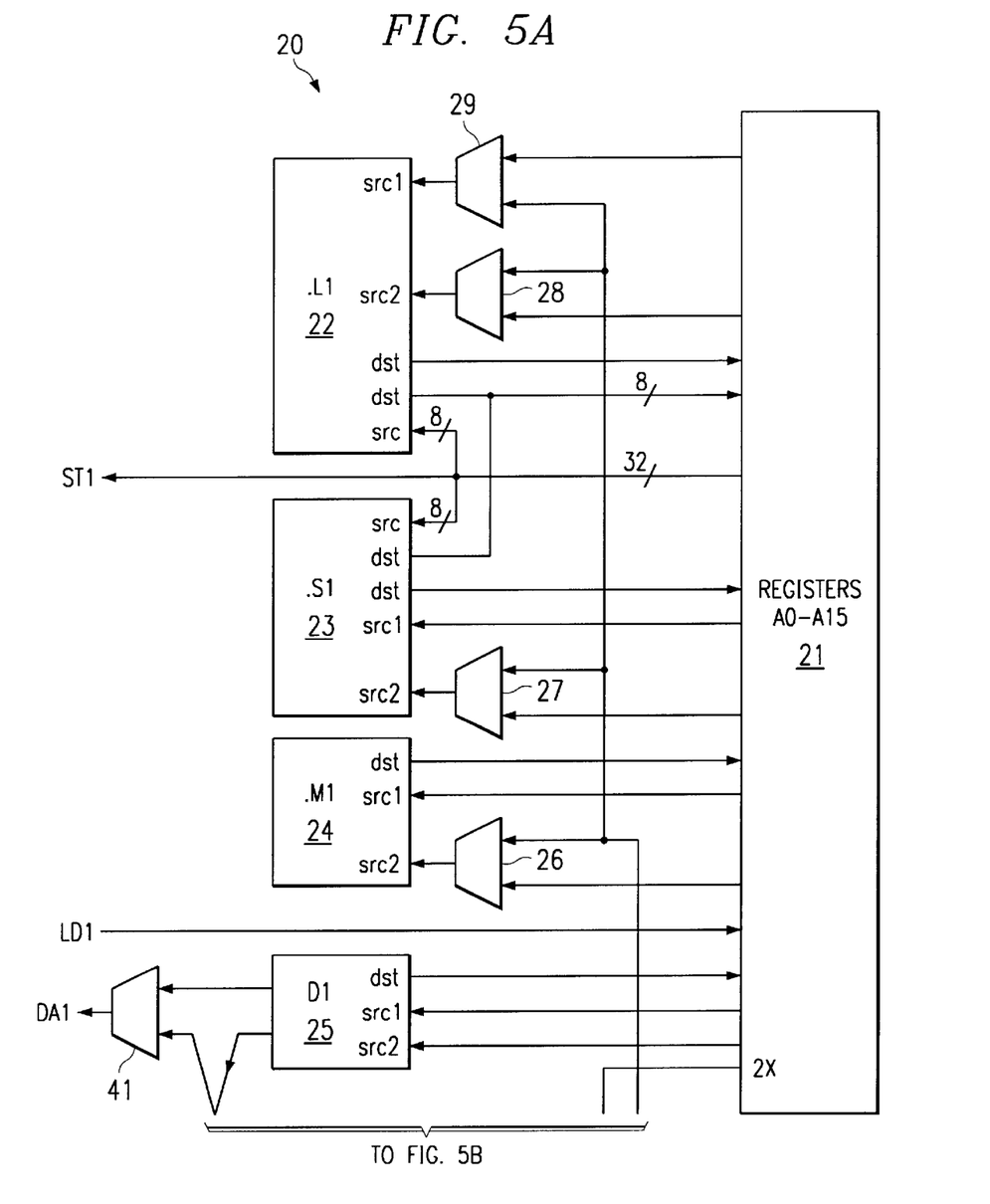
FIG. 5 illustrates additional details of the digital signal processor of FIG. 4.
Figure 5B:
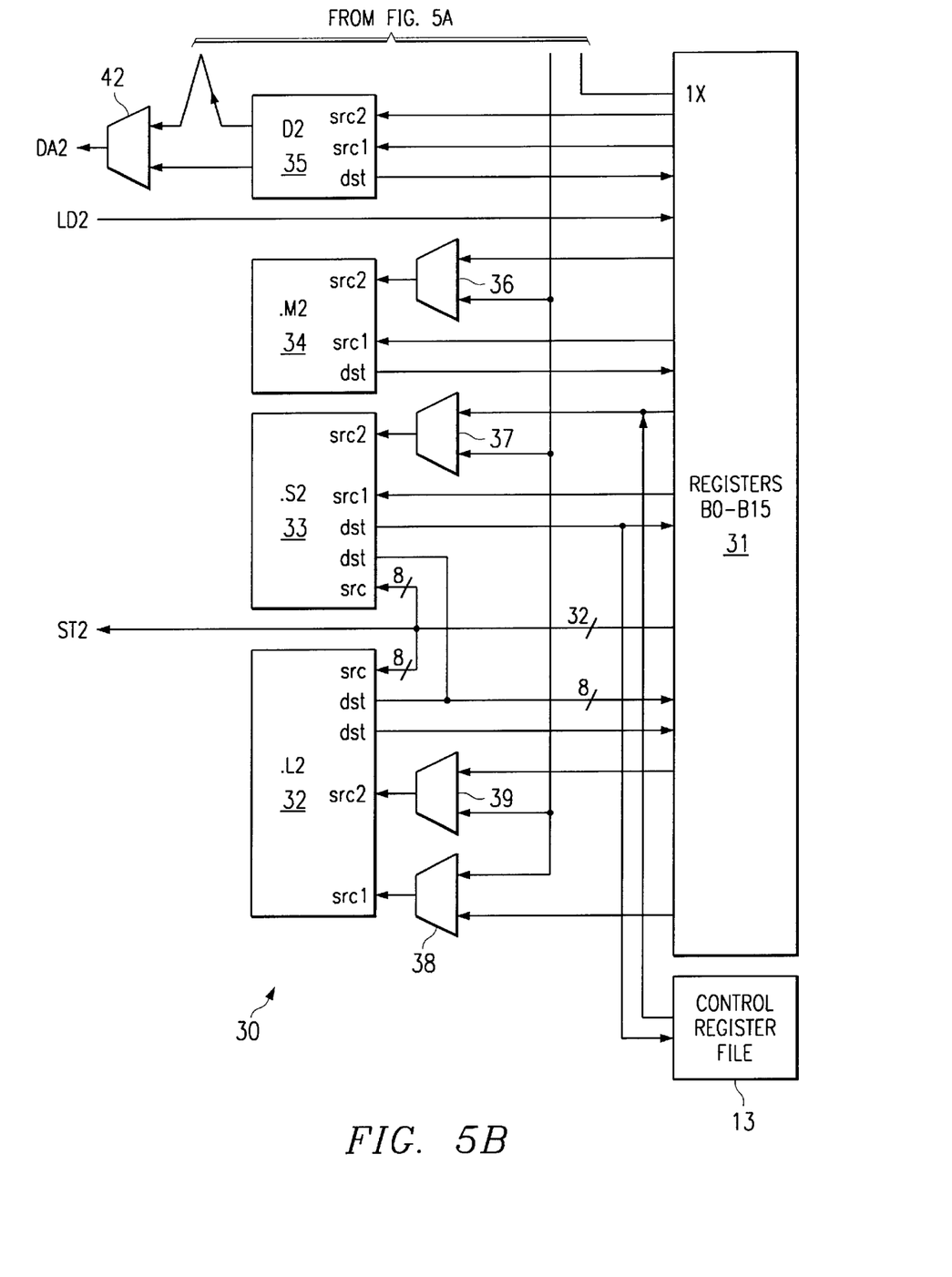

FIG. 5 (comprising FIGS. 5a and 5b) illustrates the data paths of central processing unit 1. There are two general purpose register files 21 and 31. Each of general purpose register files 21 and 31 include 16 32-bit registers. These registers are designated registers A0 to A15 for register file 21 and registers B0 to B15 for register file 31. These general purpose registers can be used for data, data address pointers or as condition registers.

There are eight functional units L1 unit 22, L2 unit 32, S1 unit 23, S2 unit 33, M1 unit 24, M2 unit 34, D1 unit 25 and D2 unit 35. These eight functional units can be divided into two virtually identical groups of 4 (22 to 25 and 32 to 35) coupled to a corresponding register file. There are four types of functional units designated L, S, M and D. Table 2 lists the functional capabilities of these four types of functional units.

TABLE 2

| Functional Unit | Description |
| --- | --- |
| L Unit (L1, L2) | 32/40-bit arithmetic and compare operations<br>Left most 1, 0, bit counting for 32 bits<br>Normalization count for 32 and 40 bits<br>32 bit logical operations |
| S Unit (S1, S2) | 32-bit arithmetic and bit-field operations<br>32/40 bit shifts<br>32 bit logical operations<br>Branching<br>Constant generation<br>Register transfers to/from control register file |
| M Unit (M1, M2) | 16 × 16 bit multiplies |
| D Unit (D1, D2) | 32-bit add, subtract, linear and circular address calculation |

Most data lines within central processing unit 1 support 32-bit operands. Some data lines support long (40-bit) operands. Each functional unit has its own 32-bit write port into the corresponding general-purpose register file. Functional units L1 unit 22, S1 unit 23, M1 unit 24 and D1 unit 25 write to 15 register file 21. Functional units L2 unit 32, S2 unit 33, M2 unit 34 and D2 unit 35 write to register file 31. As depicted in FIG. 5, each functional unit has two 32-bit read ports for respective source operands src1 and src2 from the corresponding register file. The four functional units L1 unit 22, L2 unit 32, S1 unit 23 and S2 unit 33 have an extra 8-bit wide write port for 40-bit long writes as well as an extra 8-bit wide read port for 40-bit long reads. Because each functional unit has its own 32-bit write port, all eight functional units can be used in parallel every cycle.

FIG. 5 illustrates cross register paths 1X and 2X. Function units L1 unit 22, S1 unit 23 and M1 unit 24 may receive one operand from register file 31 via cross register path 1X. Function units L2 unit 32, S2 unit 33 and M2 unit 34 may receive one operand from register file 21 via cross register path 2X. These paths allow the S, M and L units from each data path to access operands from either register file 21 or 31. Four functional units, M1 unit 24, M2 unit 34, S1 unit 23 and S2 unit 33, have one 32-bit input multiplexer which may select either the same side register file or the opposite file via the respective cross path 1X or 2X. Multiplexer 26 supplies an operand from either register file 21 or register file 31 to the second source input src2 of M unit 24. Multiplexer 36 supplies an operand from either register file 21 or register file 31 to the second source input src2 of M unit 34. Multiplexer 27 supplies an operand from either register file 21 or register file 31 to the second source input src2 of S unit 23. Multiplexer 37 supplies an operand from either register file 21 or register file 31 to the second source input src2 of S unit 33. Both the 32-bit inputs of function units L1 unit 22 and L2 unit 32 include multiplexers which may select either the corresponding register file or the corresponding cross path. Multiplexer 28 supplies the first source input src1 of L unit 22 and multiplexer 29 supplies the second source input src2. Multiplexer 38 supplies the first source input src1 of L unit 32 and multiplexer 39 supplies the second source input src2.

There are two 32-bit paths for loading data from memory to the register file. Data path LD1 enables loading register file A and data path LD2 enables loading register file B. There are also two 32-bit paths for storing register values to memory from the register file. Data path ST1 enables storing data from register file A to memory and data path ST2 enables storing data from register file B to memory. These store paths ST1 and ST2 are shared with the L unit and S unit long read paths.

FIG. 5 illustrates two data address paths (DA1 and DA2) coming from respective D units 25 and 35. These data address paths allow supply of data addresses generated by the D units to specify memory address. D unit 25 and D unit 35 each supply one input to address multiplexers 41 and 42. Address multiplexers 41 and 42 permit D unit 25 to support loads from memory to either register file 21 or register file 31 and to support stores from either register file 21 or register file 31 to memory. Address multiplexers 41 and 42 likewise permit D unit 35 to support loads and stores involving either register file 21 or register file 31.

FIG. 5 illustrates data paths enabling S2 unit 33 to read from and to write to the control register file 13.

What is claimed is:

1. A data processing system comprising:
 a central processing unit executing program instructions to manipulate data;
 at least one level one cache connected to said central processing unit temporarily storing at least one of program instructions for execution by said central processing unit and data for manipulation by said central processing unit;
 a level two unified cache connected to said level one instruction cache and said level one data cache for supply of instructions to said level one instruction cache and data to said level one data cache;
 a directly addressable memory;
 a direct memory access unit connected to said directly addressable memory and adapted for connection to an external memory; and
 a superscalar memory transfer controller connected to said level one instruction cache, said level one data cache, said level two unified cache, said directly addressable memory and said direct memory access unit, said superscalar memory transfer controller operable in memory cycles and capable of scheduling plural non-interfering memory movements to and from said level two unified cache and said directly addressable memory each memory cycle in accordance with a predetermined priority of operation.

2. The data processing system of claim 1, wherein:

said at least one level one cache includes a level one instruction cache temporarily storing program instructions for execution by said central processing unit.

3. The data processing system of claim 1, wherein:

said at least one level one cache includes a level one data cache temporarily storing data for manipulation by said central processing unit.

4. The data processing system of claim 1, wherein:

said level two unified cache includes a cache tag memory having plural read ports and a single write port; and said superscalar memory transfer controller is capable of scheduling plural cache tag memory read accesses and one cache tag memory write access in a single memory cycle.

5. The data processing system of claim 1, wherein:

said level two unified cache includes a cache access state machine for each of said at least one level one caches, a cache access state machine for said direct memory access unit, a cache access state machine for level two unified cache read miss service, a cache access state machine for level two unified cache write miss service and a cache access state machine for victim eviction service; and said superscalar memory transfer controller is capable of scheduling plural of said cache access state machines in a single memory cycle.

6. The data processing system of claim 1, wherein:

said level two unified cache consists of plural memory banks; and said superscalar memory transfer controller is capable of scheduling plural memory accesses to non-interfering memory banks of said level two unified cache in a single memory cycle.

7. In data processing system including a central processing unit executing program instructions to manipulate data, at least one level one cache connected to said central processing unit temporarily storing at least one of program instructions for execution by said central processing unit and data for manipulation by said central processing unit, a level two unified cache connected to said level one instruction cache and said level one data cache for supply of instructions to said level one instruction cache and data to said level one data cache, a directly addressable memory and a direct memory access unit connected to said directly addressable memory and adapted for connection to an external memory, the method comprising the steps of:

operating in memory cycles; and scheduling plural non-interfering memory movements to and from said level two unified cache and said directly addressable memory in accordance with a predetermined priority of operation in a single memory cycle.

8. The method of claim 7, wherein said level two unified cache includes a cache tag memory has plural read ports and a single write port, the method further comprising the step of:

scheduling plural cache tag memory read accesses and one cache tag memory write access in single memory cycle.

9. The method of claim 7, further comprising the step of:

scheduling a plurality of a cache access state machine for each of said at least one level one caches, a cache access state machine for said direct memory access unit, a cache tag access state machine for level two unified cache read miss service, a cache tag access state machine for level two unified cache write miss service and a cache tag access state machine for victim eviction service in a single memory cycle.

10. The method of claim 7, wherein said level two unified cache consists of plural memory banks, the method further comprising the step of:

scheduling plural memory accesses to non-interfering memory banks of said level two unified cache in a single memory cycle.

\* \* \* \* \*